United States Patent Office 3,801,700
Patented Apr. 2, 1974

3,801,700
PREPARATION OF $^{238}Pu^{16}O_2$
Robert L. Nance, Los Alamos, N. Mex., Joseph A. Leary, Postfach, Germany, and Lawrence J. Mullins, Los Alamos, N. Mex., assignors to the United States of America as represented by the United States Atomic Energy Commission
No Drawing. Filed Mar. 28, 1972, Ser. No. 238,977
Int. Cl. C01g 56/00
U.S. Cl. 423—251                                       2 Claims

ABSTRACT OF THE DISCLOSURE

A method of preparing $^{238}Pu^{16}O_2$ in which massive electrorefined $^{238}Pu$ is powdered by successive hydride-dehydride cycles. The powdered and largely but not completely dehydrided $^{238}Pu$ is then reacted with gaseous $H_2^{16}O$ in a helium stream at a temperature of 580–610° C. The oxide thus produced is then heated to 700° C. under vacuum for a short time to remove volatile impurities.

BACKGROUND OF THE INVENTION

The invention described herein was made in the course of, or under, a contract with the U.S. Atomic Energy Commission. It relates to a method of preparing plutonium dioxide radioisotopic fuel and more particularly to a method of preparing a fuel of this type of the isotopic composition $^{238}Pu^{16}O_2$ meeting the maximum permissible neutron emission rates allowable for plutonium dioxide used in life-support applications.

The art discloses that $^{238}PuO_2$ is quite useful as a radioisotopic heat source. Unfortunately, this material has a neutron emission rate too high to allow its use in biological or medical life support applications as, e.g., in artificial hearts or cardiac pacemakers. Small samples of pure $^{238}Pu$ have a neutron emission rate of about $2.8 \times 10^3$ n./sec. per gram $^{238}Pu$ from spontaneous fission. This is the minimal emission rate that can be achieved. However, when impurities such as Li, Be, C, F, Na, Mg, Al, and Si are present in the Pu ($\alpha$,n) reactions substantially increase the neutron emission rate. The oxygen isotopes $^{17}O$ and $^{18}O$, particularly $^{18}O$, also undergo ($\alpha$,n) reactions. Although oxygen having a natural isotopic distribution is almost completely $^{16}O$ which does not partake of this reaction, nonetheless there is sufficient $^{17}O$ (0.037 at. percent) and $^{18}O$ (0.204 at. percent) present in $^{238}PuO_2$ produced from natural oxygen to also substantially increase the neutron emission rate. It is therefore highly advantageous to remove as much $^{17}O$ and $^{18}O$ as possible from the oxide.

According to the literature, plutonium dioxide consisting substantially of $^{238}Pu^{16}O_2$ has been prepared in the following ways:
1. Precipitation of $^{238}Pu$ from solution as the oxalate (depleted in $^{17}O$ and $^{18}O$) and calcination to form the oxide (see "Description of the Prior Art" in U.S. Pat. No. 3,420,640).
2. Oxygen isotopic exchange of $^{238}PuO_2$ with $H_2^{16}O$ (U.S. Pat. No. 3,420,640 and AEC Research and Development Report DP-1153).
3. Reaction of $^{238}PuH_{(2+x)}$, where $x \leq 1$, with $^{16}O_2$ gas (Rutherford et al., "Preparation and Neutron Counting of $^{238}PuO_2$ Depleted in $^{18}O$," Nuclear Application, vol. 3, p. 366 (1967)).

None of these modes of preparation have produced $^{238}Pu^{16}O_2$ meeting the standards required for neutron emission from radioisotopic energy sources used for biological or medical purposes, e.g., as heat sources for cardiac pacemakers and artificial hearts.

SUMMARY OF THE INVENTION

We have now found that $^{238}Pu^{16}O_2$ meeting the maximum neutron emission rates allowable for medical grade plutonium dioxide may readily be prepared by (1) powdering massive electrorefined $^{238}Pu$ in successive hydride-dehydride cycles, (2) reacting the powdered and largely but not completely dehydrided $^{238}Pu$ with $H_2^{16}O$ in an inert gas, e.g., He, stream at a temperature of 580–610° C., and (3) heating the oxide thus produced to 700° C. under vacuum for a short time to remove volatile impurities.

$^{238}Pu^{16}O_2$ produced according to the method of this invention contains less than 20 p.p.m. $^{18}O$ and has a neutron emission rate of less than $3.4 \times 10^3$ n./sec. per gram $^{238}Pu$. This is equivalent to the maximum allowable neutron emission rate for 5 W or less power sources and within the maximum allowable neutron emission for larger power sources.

GENERAL CONSIDERATIONS

For use as a source of thermal energy in biomedical applications, plutonium is required to meet the following specifications. It must be at least 90 at. percent $^{238}Pu$ and contain less than 0.30 p.p.m. $^{236}Pu$. Chemically, it must not contain more than 0.2 wt. percent of impurities with the following limits on specific impurities.

| Element/a | P.p.m.b | Element | P.p.m. | Element | P.p.m. |
|---|---|---|---|---|---|
| $^{232}$U | <0.03 | Ti | <1 | Zr | <10 |
| Li | <1.0 | V | <1 | Mo | <5 |
| Be | <0.005 | Cr | <2 | Cd | <1 |
| B | <3.0 | Mn | <1 | Sr | <5 |
| F | <2.0 | Fe | <50 | Cs | <2 |
| Na | <25 | Co | <1 | Ba | <0.2 |
| Mg | <25 | Ni | <10 | La | <1 |
| Al | <50 | Cu | <5 | Hf | <1 |
| Si | <25 | Zn | <5 | Re | <1 |
| K | <50 | Rb | <1 | Pb | <5 |
| Ca | <100 | Sr | <1 | Bi | <1 | a The natural isotopic abundance is assumed for all elements listed except U.
b P.p.m.—g. of element per $10^6$ g. of Pu.

For cylindrical power sources with the length equal to the diameter, the maximum permissible neutron emission rate is $3.4 \times 10^3$ n./sec. per gram $^{238}Pu$ for sources having power outputs not exceeding 5 W. For a 30 W source, the maximum permissible rate is $3.5 \times 10^3$ n./sec. per gram $^{238}Pu$.

In the process of this invention, electrorefined $^{238}Pu$ is reacted with $H_2^{16}O$ produced by the reaction of $H_2$ with $N^{16}O$ in the presence of a nickel catalyst. The $N^{16}O$ is formed by thermal distillation of NO. Although small samples of pure $^{238}Pu$ have a neutron emission rate of only $2.8 \times 10^3$ n./sec. per gram $^{238}Pu$, it is well nigh impossible to produce absolutely pure $^{238}Pu$. Further, the oxide $^{238}PuO_2$ is preferably used because of its higher melting point and greater chemical stability than the metal.

The purest form of $^{238}Pu$ available is that made by electrorefining techniques (see, e.g., Mullins et al., "Plutonium-238 for Biomedical Applications," Nuclear Applications, vol. 6, p. 287 (1969)). It has a neutron emission rate of $3.1 \times 10^3$ n./sec. per gram $^{238}Pu$. It is critical to the process of this invention that electrorefined $^{238}Pu$ be used as the metal reacting with the $H_2^{16}O$.

The formation of $PuH_{(2+x)}$, where $x \leq 1$, and its subsequent thermal decomposition is a well known method of increasing the surface area and therefore the reactivity of plutonium metal. In hydriding Pu metal there is a critical $H_2$ addition rate above which melting will be caused in the metal because of the heat of formation of $PuH_x$. Pure Pu melts at 640° C. The critical rate, which has not been well characterized, varies inversely with the amount of $^{238}Pu$ (due to its heat of radioactive decay)

and is also dependent on such factors as the state of subdivision of the Pu metal and the rate heat is conducted away from the material. The slower the rate of $H_2$ addition and the lower the temperature, the greater the material breakup caused by the hydriding. It is therefore desirable to select the slowest rate of $H_2$ addition that will allow adequate preparation progress.

DESCRIPTION OF THE PREFERRED EMBODIMENT

Hydrogen gas is admitted to an evacuated reaction tube containing massive electrorefined $^{238}$Pu at a rate less than the critical rate, typically at a rate of $5\ (\pm 1) \times 10^{-3}$ mols $H_2$ per minute per 0.5 mol of Pu. The net result is a hydride $PuH_{(2+x)}$ (where $x \leq 1$). The reaction tube containing the hydride is then opened to a vacuum system and the Pu is heated rapidly to within 50° of the dehydriding temperature (580–610° C., depending on the size of the material and its $^{238}$Pu content). The temperature is then increased 2 to 4° C./min. until the $H_2$ pressure indicates rapid dehydriding. The temperature is held constant at the dehydriding temperature until the hydrogen pressure decreases to 200–300 microns. The reaction tube is then cooled and the hydride-dehydride cycle repeated twice more.

To form the $^{238}Pu^{16}O_2$, a gas stream consisting of an He-$H_2^{16}O$ mixture is flowed over the powdered and substantially dehydrided $^{238}$Pu. The mixture contains about 0.4 to 0.6 gram $H_2^{16}O$ per gram $^{238}$Pu to be oxidized. This is a three- to fourfold excess over the theoretical amount of $H_2^{16}O$ required to completely oxidize the Pu. The flow rate varies but typically the mixture is flowed for about 45 hours over 0.5 mol of Pu.

After the initial admission of the gas mixture to the reaction tube, the tube is heated to the same temperature range used for the dehydriding. This ensures rapid oxidation but no melting of the metal. Once the oxidation reaction is completed it is desirable to heat the oxide to 700° C. for an arbitrary 0.7 hour to melt any slight amount of metal remaining unoxidized and thus present new surface area for oxidation by the $H_2^{16}O$.

The reaction tube is then evacuated at 700° C. for 0.7 hour. This removes a small amount of volatile impurities and is considered a necessary step. Again the time is somewhat arbitrary.

What we claim is:

1. A method of preparing $^{238}Pu^{16}O_2$ having a neutron emission rate of less than $3.4 \times 10^3$ n/sec. per gram $^{238}$Pu which comprises (1) successively hydriding and dehydriding a massive portion of electrorefined $^{238}$Pu to produce a substantially dehydrided $^{238}$Pu powder, said hydriding being performed by $H_2$ addition to the $^{238}$Pu at a rate less than the rate at which melting will be caused in the $^{238}$Pu by the heat of formation of the plutonium hydride, (2) flowing a gas mixture consisting of an inert gas and $H_2^{16}O$ over the substantially dehydrided $^{238}$Pu powder at a temperature of 580–610° C. for a time sufficient to completely oxidize it, and (3) heating the resulting oxide to 700° C. under vacuum for a time sufficient to remove volatile impurities.

2. The method of claim 1 wherein said hydriding and dehydriding is performed three times, said inert gas is He, said gas mixture contains 0.4 to 0.6 gram $H_2^{16}O$ per gram $^{238}$Pu to be oxidized, and said oxide is heated to 700° C. in the presence of $H_2^{16}O$ for a time sufficient to melt any slight amount of metal remaining unoxidized.

References Cited

UNITED STATES PATENTS

| 3,515,875 | 6/1970 | Keshishian | 252—301.1 R |
|---|---|---|---|
| 3,420,640 | 1/1969 | Porter | 423—251 |

OTHER REFERENCES

Rutherford et al., Preparation of O Reduced in Masses 17 and 18 and Effect on Total Neutrons Emitted from $^{238}PuO_2$ . . ., Trans. Am. Nuc. Soc., vol. 9, #2, 1966, pp. 599–600.

Keshishian et al., Use of $O^{16}$ with $Pu^{238}$ to Reduce Neutron Yield, Trans. Am. Nuc. Soc., vol. 9, #1, 1966, p. 102 (copy in Sci. Lib.).

CARL D. QUARFORTH, Primary Examiner

R. L. TATE, Assistant Examiner

U.S. Cl. X.R.

252—301.1 R; 424—1